United States Patent [19]

Yoshida et al.

[11] 4,046,645
[45] Sept. 6, 1977

[54] METHOD OF MANUFACTURING SOLID ELECTROLYTIC CAPACITOR

[75] Inventors: Akihiko Yoshida, Sakai; Atsushi Nishino, Neyagawa, both of Japan

[73] Assignee: Matsushita Electric Industrial Co., Ltd., Japan

[21] Appl. No.: 692,945

[22] Filed: June 4, 1976

[30] Foreign Application Priority Data

June 6, 1975 Japan ................................ 50-68886

[51] Int. Cl.$^2$ .......................... C25D 9/06; H01G 9/24
[52] U.S. Cl. ..................................... 204/37 R; 29/570; 204/38 A; 204/42; 204/56 R; 204/57; 204/96
[58] Field of Search .................... 204/42, 38 A, 37 R, 204/56 R, 57, 58, 96; 317/230; 29/570

[56] References Cited

U.S. PATENT DOCUMENTS 3,100,329  8/1963  Sherman ........................... 29/570

OTHER PUBLICATIONS

L. Maissel, IBM Tech. Disc. Bulletin, vol. 5, No. 8, p. 11, Jan. 1963.

Primary Examiner—G. L. Kaplan
Attorney, Agent, or Firm—Wenderoth, Lind & Ponack

[57] ABSTRACT

A method of manufacturing solid electrolytic capacitors, wherein deposition of electrolyte of a semiconductive metal oxide on a semiconductive dielectric film is performed by electrolytic oxidation from a bath of a metallic salt solution. During the electrolysis, the dielectric film is irradiated by radiation, the energy of which is enough to allow the valence electrons to enter the conduction band, so that due to the thus increased charge carriers the dielectric film more readily conducts electric current.

9 Claims, 12 Drawing Figures

METHOD OF MANUFACTURING SOLID ELECTROLYTIC CAPACITOR

BACKGROUND OF THE INVENTION

1. Field of the Invention

This invention relates to a method of making a solid electrolytic capacitor, and more particulary pertains to such method including a step of electrodepositing solid electrolyte.

2. Description of the Prior Art

Hitherto known solid electrolytic capacitors have usually been manufactured by the steps of electrolytically oxidizing the surface of a plate or a porous body of a so-called valve action metal, for instance tantalum, titanium, niobium, zirconium, aluminum, hafnium and tungsten, which are capable of being oxidized to form an anode film, thereby producing electrode having a semiconductive dielectric film having a rectifier function. The electrode is impregnated with a material capable of forming a semiconductor, and the impregnated electrode is subjected to pyrolysis to form an oxide semiconductor layer i.e. a solid electrolyte layer contiguous to the anode film and finally the oxide semiconductor layer is coated with a conductive material such as colloidal carbon, silver paint and solder.

In such method it is difficult to deposit the electrolyteforming material such as manganese nitrate $Mn(NO_3)_2$ in a uniform thickness on an anode body. Also, since the deposited manganese nitrate is rapidly decomposed thermally at a high temperature of 200° C to 400° C in the pyrolytic process, it is extremely difficult to obtain a dense and uniform layer of pyrolytic manganese dioxide on the dielectric film of the electrode. Therefore, it is necessary to repeat the four steps of immersing the anode body in a solution of manganese nitrate $Mn(NO_3)_2$, pyrolysis, washing with water and re-forming, many times to produce a solid electrolytic capacitor.

Repeating the pyrolytic step many times, however, results in generation of nitrogen oxide gas which is at high temperature and which deteriorates of the dielectric film of the valve action metal both thermally and chemically, and leakage current is increased in proportion to the number of pyrolytic steps involved. Further, with the pyrolytic process alone, the manganese dioxide layer is formed not uniformly but locally, which leads to the short-circuiting between the anode and cathode after the application of the conductive material, so that the capacitor function is lost. This problem is extremely significant in the manufacture of small size solid capacitors and thin film solid capacitors. Furthermore, with a number of repeated pyrolytic steps, the obtained manganese oxide layer has a low density and inferior conductivity and lacks surface smoothness so that the formation or attachment of an electrode is extremely difficult.

In addition to the above-mentioned prior-art method, there has also been developed a method employing electrochemical deposition in forming semiconductive manganese oxide material on the dielectric oxide film. In such method, semiconductive oxide is formed by pyrolysis of a metal salt solution on the dielectric film and then semiconductive oxide e.g. $MnO_2$ is electrochemically deposited on the thus produced semiconductive oxide film through electrolytic oxidation of an Mn salt solution such as $MnSO_4$.

However a dielectric oxide film such as $Ta_2O_5$ is essentially insulating when the Ta body is positive and not enough current for the electrolytic oxidation can be supplied to the film without inducing electronic breakdown, which means that in this method electrolytic oxidation i.e. deposition has to be performed for longer time with very low current density to get sufficient semiconductive oxide deposition. Further, even in this electrochemical method, a few repeats pyrolytic conversions of $Mn(NO_3)_2$ to $MnO_2$ is necessary prior to electrodeposition in order to get a smooth and uniform layer of semiconductive oxide via electrolysis. This condition essentially results in thermal deterioration of the oxide film. The thus deposited semiconductive oxide deteriorates the tan δ or leakage current of the capacitor, because it is deposited at the defect site of the oxide film. Furthermore semiconductive oxide will be deposited nonuniformly by this method, because oxide defects are distributed nonuniformly on the surface.

SUMMARY OF THE INVENTION

Object of the Invention

The first object of this invention is to provide a method of depositing electrolyte layer whereby sufficient electrolytic deposition is easily obtained without deteriorating the dielectric film.

The second object of this invention is to provide an efficient method of making a solid electrolytic capacitor.

The third object of this invention is to provide a method of depositing an electrolyte layer wherein the obtained electrolyte is superior when applied to a electrolytic capacitor, in terms of the self-healing property, etc.

These objectives are achieved by the method of this invention wherein the dielectric layer is irradiated by radiation, the energy of which is high enough to allow valence electrons to enter the conduction band of the dielectric material, so that current readily flows, and in such condition, electrodeposition of the electrolyte is performed.

BRIEF DESCRIPTION OF THE DRAWINGS

Other objects and advantageous features of the present invention will become apparent from the following explanation taken in connection with some embodiments thereof, by referring to the accompanying drawings, in which.

DETAILED DESCRIPTION OF THE PREFERRED EMBODIMENT

In the following, the principles of this invention are described, referring to Ta as a valve action metal and $MnO_2$ as semiconductive oxide.

Figure 1:
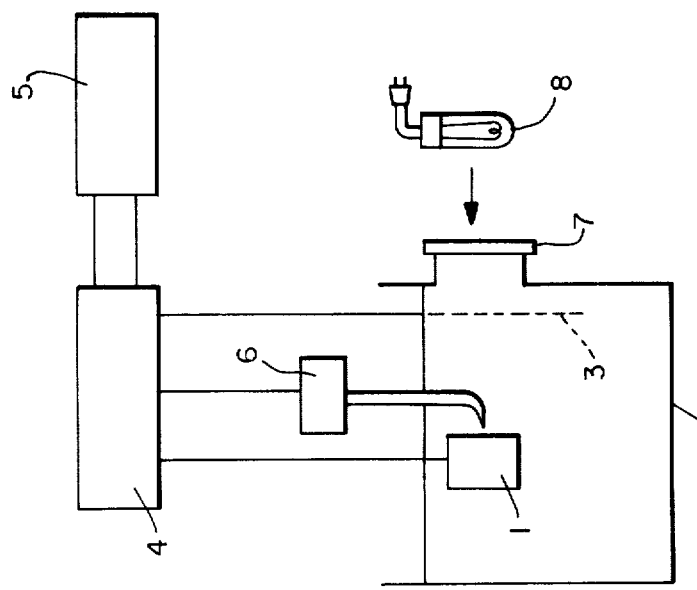
FIG. 1 is a graph showing the V - I characteristic curve of $Ta_2O_5$ both with and without light irradiation.
Figure 2:
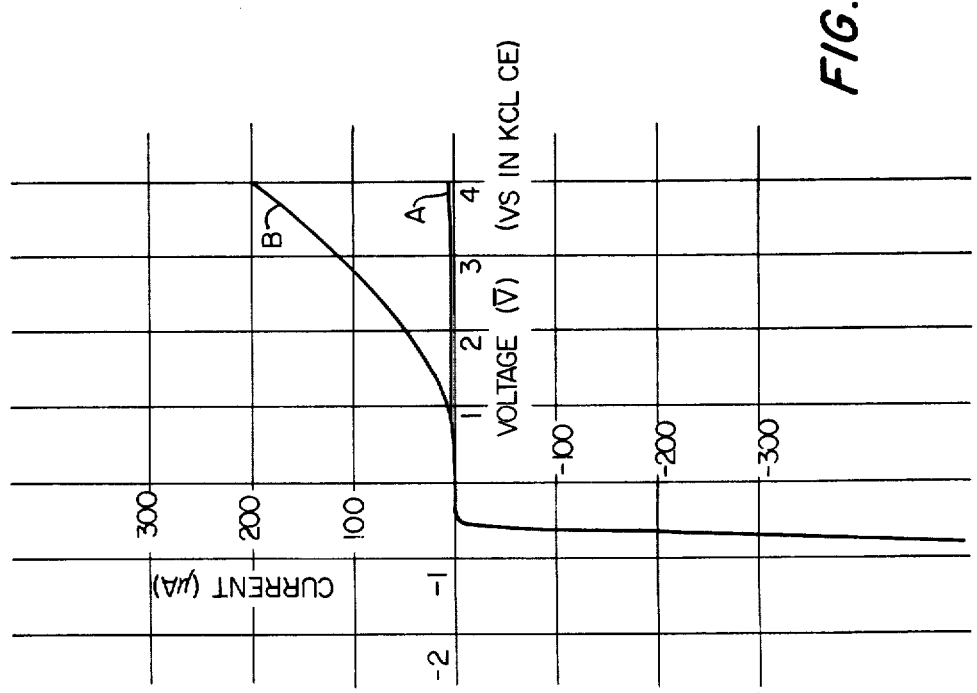
FIG. 2 is a block diagram showing an apparatus for measuring the V - I curve of FIG. 1.

FIG. 1 shows V - I characteristic curve of $Ta_2O_5$ measured by the apparatus as shown in FIG. 2. Referring to FIG. 2, Ta anode 1 having anodically formed $Ta_2O_5$ on the surface is immersed in 0.1 M/1 Mn $(OCOCH_3)_2$ solution held in a vessel 2. Pt counter electrode 3 is also immersed in the solution. Ta anode 1 and Pt counter electrode 3 are connected to a potentiostat 4 so that circuit for measurement is constructed. An X - Y recorder 5 is connected to the potentiostat 4, thereby the voltage supplied to the Ta anode 1 and the current flowing therethrough being measured. Numeral 6 represents a 1N standard calomel electrode. The vessel 2 has a quartz window 7 through which a high pressure mercury lamp 8 irradiates the Ta anode 1 with U.V. (ultraviolet)rays.

As shown in FIG. 1 with line A, $Ta_2O_5$ has a rectifying property in the ground state i.e. without irradiation, so that when the $Ta_2O_5$ is anodically polarized, little current flows in this direction. As shown in FIG. 1 with line B, however, when the $Ta_2O_5$ is irradiated with the U.V. rays it allows, considerable current to flow in above mentioned direction. This is due to the electronic structure of $Ta_2O_5$ as follows.

Figure 3A:
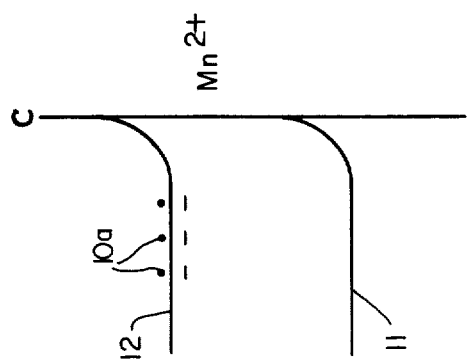
FIGS. 3a and 3b are views showing the mechanism of the photo excitation of an oxide electrode.
Figure 3B:
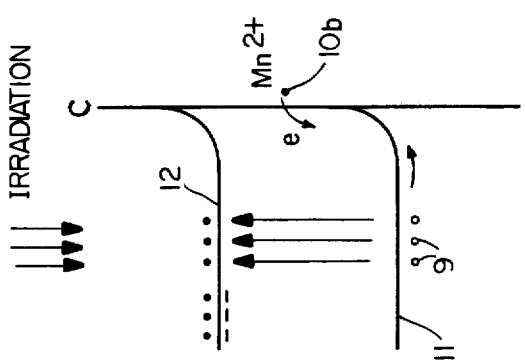

Referring to FIGS. 3a and 3b, the area to the left of line C represents a layer of $Ta_2O_5$ and the area to the right represents an electrolyte solution. Since $Ta_2O_5$ is n-type semiconductor, as presented in the change from FIG. 3a to FIG. 3b, positive holes 9 which are minority carriers are generated through photoexcitation of electron 10a from valence band 11 to conduction band 12 by U.V. irradiation. When the positive holes 9 are generated in the valence band 11, electrons 10b become injected more easily from the electrolyte to tantalum oxide electrode and thus a photocurrent is induced. And when the radiation is removed from the tantalum oxide electrode after a few minutes, the current through $Ta_2O_5$ decreases to the same value as before the irradiation. Regarding the properties of $Ta_2O_5$ i.e. V - I characteristics, rectifying properties, dielectric constant of $Ta_2O_5$, etc., the U.V. ray irradiation does not cause permanent effects on them.

Applying the experimental results described above, manganese dioxide can be deposited directly onto the tantalum oxide film through electrolysis. When tantalum oxide is irradiated with U.V. rays and polarized anodically with a suitable current density in the aqueous solution containing $Mn^{2+}$ ion for example $MnSO_4$, electrolytic oxidation reaction of $Mn^{2+}$ ion occurs on the $Ta_2O_5$ electrode and thus $MnO_2$ is deposited on the $Ta_2O_5$ film. The value of current density which can be applied without causing electronic breakdown in the oxide film is much higher with irradiation than without. Therefore, a considerable and sufficient $MnO_2$ layer can be electrolytically deposited without electronic breakdown of the dielectric oxide film.

The thus formed $MnO_2$ layer is very uniform and is intimately and strongly attached to the electrode, because the current distribution on the dielectric oxide film electrode during irradiation is uniform.

The bath temperature of electrolysis should be very strictly controlled. The crystalline structure of $MnO_2$ formed by electrolysis depends very much on the bath temperature of the electrolyte. With a low bath temperature, deposited $MnO_2$ is weakly attached to the electrode and only forms sludge beneath the anode in the electrolyte.

Figure 5:
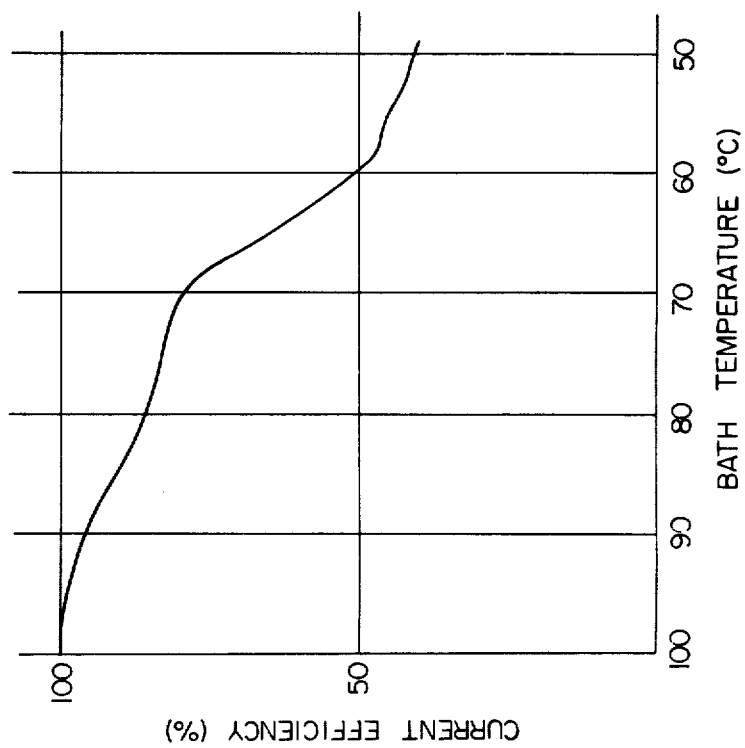
FIG. 5 is a graph showing the relation between bath temperature and current efficiency of deposition.
Figure 6:
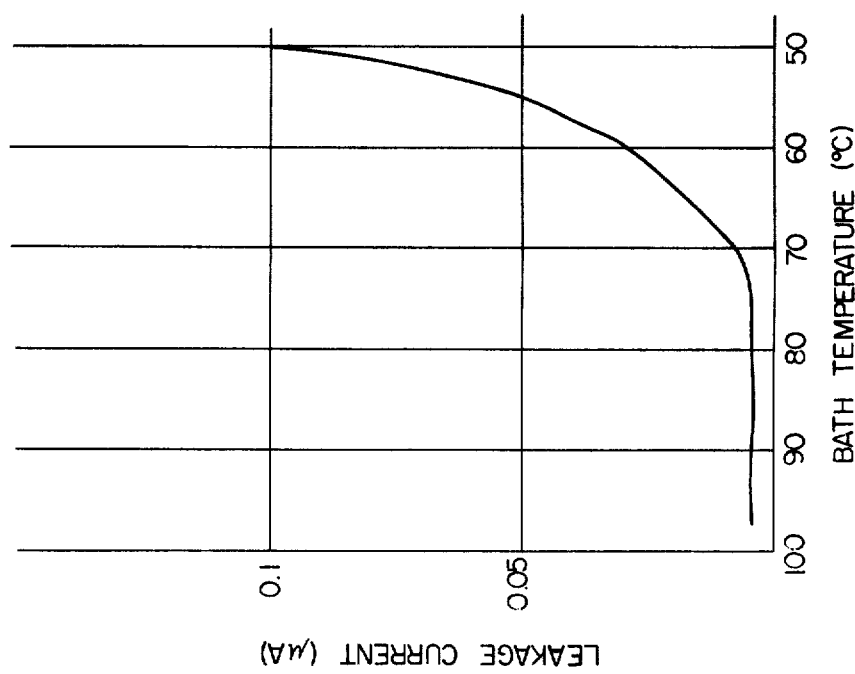
FIG. 6 is a graph showing the relation between bath temperature and the leakage current of the obtained capacitor.

FIG. 5 shows the relationship between bath temperature and current efficiency of $MnO_2$ deposition, from which it is found that current efficiency abruptly decreases with the bath temperature is under 70° C. With the bath temperature of over 70° C the obtained $MnO_2$ is suitable as a solid electrolyte for a capacitor which has strong self-healing power. This result is in good agreement with FIG. 6, which shows the relation between bath temperature and leakage current.

The thus formed $MnO_2$ has a Γ-type crystalline structure having water of crystallization, which may be removed by heat treatment at over 110° C and thereafter a low dissipation solid capacitor is obtained.

Since this manufacturing method does not at all involve any thermal decomposition process which is harmful to $Ta_2O_5$ film thermally or chemically, high leakage current through $Ta_2O_5$ due to the defect attributed to such process is avoided by this method. Also, this method is very simple because no troublesome decomposition cycle is at all necessary.

Furthermore, the desired amount of $MnO_2$ can be electrolytically deposited in less time by this method than by the hiterto known method, because current density can be set much higher than that of the hitherto known method. The fact that only the short time for electrolysis is necessary is great advantage for practical application on an assembly line.

The major requirements for the method according to this invention are summarized as follows:

1. Base material of the capacitor body: Valve action metal such as titanium, aluminum, tungsten, tantalum, hafnium and alloys of these metals and also silicon and germanium are included.

2. Medium for formation of the dielectric film; Aqueous solutions of acids such as acetic acid, citric acid, succinic acid and phosphoric acid, and fused salts are included.

3. Electrolytes for electrolytically depositing the solid electrolyte of metal oxide material: $MnSO_4$, $Mn(NO_3)_2$, $Mn(OAc)_2$, $PbSO_4$, $Pb(NO_3)_2$, $Pb(OAc)_2$ are suitable to deposit $MnO_2$ or $PbO$.

4. Concentration of the electrolyte for the deposition of the metal oxide material: 0.01 to 2.0 mol/1.

5. Electrolytic bath temperature: 70° C to 99° C.

6. Anode current density Da for electrolytic deposition:

$$200 \ \mu A/cm^2 < Da < 2000 \ \mu A/cm^2$$

7. pH of electrolyte: 3 to 7.

8. Heat treatment:

The elements should be heat-treated with a temperature of 110° C to 500° C for 30 min.

9. radiation source: High pressure mercury vapor lamp is available for irradiation. Additional considerations with respect to the above requirements are as follows:

Regarding requirement (1)

The capacitor body which is an ordinary valve action metal or an alloy thereof, may be in the form of a plate, thin film sintered body or tip.

Regarding requirement (2)

The dielectric film may be formed through oxidation by using an ordinary oxidizing bath such as a citric acid bath, ammonium phosphate bath and a bath of a fused salt.

Regarding requirement (3)

Hydrochloric acid salt of Mn or Pb is not suitable, because chlorine anion is harmful for the dielectric oxide film such as $Ta_2O_5$ or TiO.

Regarding requirement (4)

Concentration of the electrolyte for depositing manganese dioxide is suitably about 0.01 mole/l to 2.0 mole/l. When the concentration of the electrolyte is below 0.01 mole/l, sufficient overpotential to deposit manganese dioxide can not be attained, and when the concentration is over 2.0 mole/l, the electrical property of the manganese dioxide obtained is not suitable for the capacitor's solid electrolyte, for example, because dissipation becomes higher.

Regarding requirement (5)

As has been described in detail in the previous section, a temperature of below 70° C for electrolytic bath will not result in deposition of a suitably oriented crystal of $MnO_2$. Thus the bath temperature has to be maintained above 70° C.

Regarding requirement (6)

Anodic current density for electrolytic deposition is one of the most important requirements of this invention.

When an anodic oxide film is irradiated by U.V. rays photocurrent is induced in the oxide film, in other words, the resistivity of the oxide is decreased by the U.V. irradiation, although the oxide film is almost insulating without any irradiation. The resistivity with ray irradiation is second or third power times smaller than that without the ray. Therefore second or third power times current compared with the dark states can be supplied to the oxide film with irradiation and do not cause electronic breakdown in the oxide film.

Figure 7:
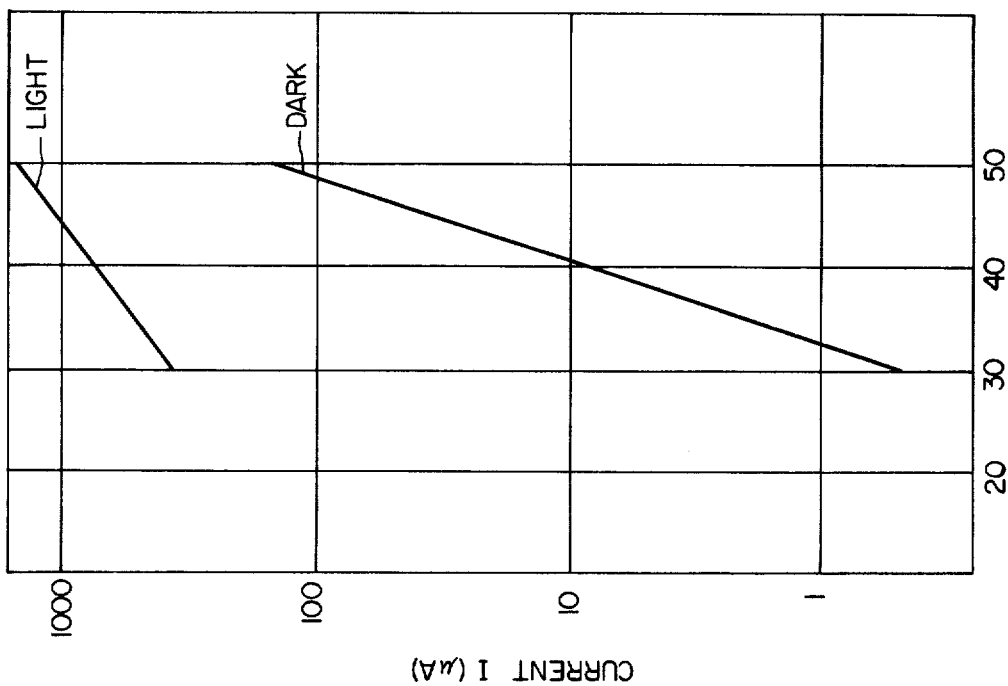
FIG. 7 is a graph showing the V - I characteristic curve of $Ta_2O_5$ in acetic acid with light irradiation.

FIG. 7 shows V - I relation curves of the oxide film with and without the irradiation in 95° C $HOA_c$ solution. The plate of electrode metal is 20 mm × 20 mm, 0.3 mm thick Ta. According to this result, anode current density for electrolytic deposition can be selected at a much higher value with the irradiation than without.

In case of a tantalum plate, the anode current density Da for depositing a uniform and dense electrolytic thin film of high quality and excellently self-healing metal oxide material directly on the dielectric oxide film without puncturing of it, is 200 $\mu A$ /cm$^2$ < Da < 2000 $\mu A$ /cm$^2$.

Below 200 $\mu A/cm^2$ sufficient deposition-overpotential is not attained and at over 2000$\mu A/cm^2$, the oxide film may be electronically broken.

Although the appropriate current density range tends to depend on the anodization voltage of the dielectric oxide, photocurrent can be observed in any thickness oxide film.

On the other hand, the appropriate current density without ray irradiation is 0.001 $\mu A$ /cm$^2$ < Da < 400 $\mu A$ /Cm$^2$.

Regarding requirement (7)

When $MnSO_4$ or other Mn salt is electrolytically oxidized to $MnO_2$, the pH of the electrolyte decreases by the formation of $H_2SO_4$ or other acid as follows:

$$MnSO_4 + 2H_2O \rightarrow MnO_2 + H_2SO_4 + H_2 \uparrow$$

On the other hand, $\alpha$ - $Mn_2O_3$ which is formed pyrolytically inside the sintered Ta body is soluble in an acidic solution of pH below 3. The semiconductive $MnO_2$ layer thus obtained has a bad effect on the capacitor's characteristic, especially its dissipation factor or leakage current. Also when the pH of the electrolyte is over 7, low grade manganese oxide tends to deposit non-Faradaically, which will give a considerable dissipation factor to the obtained capacitor.

The pH of the electrolyte is required to be maintained at 3 to 7 during electrolysis, and strictly speaking, a pH of 3 to 5 is the most favorable condition. This condition can be found by using $Mn(OAc)_2$ which has buffer action of hydrogen ion concentration around pH 5, as the electrolyte.

In the case of $MnSO_4$, a pH of 3 to 4 is most favorable to the capacitor's dissipation factor and leakage current. And when electrolysis is carried out for a short time (less than 30 min.), the pH of the electrolyte does not change so much that it affects the electric properties of the pyrolytically deposited $MnO_2$. The same condition will be required for the Pb system.

Regarding requirement (8)

Since electrolytically deposited manganese dioxide is $\gamma$ - $MnO_2$ which has water of crystallization and is likely to absorb water, the dissipation factor of the capacitor having this kind of $MnO_2$ becomes high.

When this manganese dioxide $\gamma$ - $MnO_2$ is maintained under the temperature of 110° C to 500° C for over 30 min, it will change into $\beta$ - $MnO_2$ which imparts a low dissipation to the capacitor. This $\beta$ - $MnO_2$ differs from the one which is maintained by pyrolysis of the prior art.

Regarding requirement (9)

For n-type $Ta_2O_5$ the forbidden energy gap is commonly reported as 4.6 eV. which means ca. 250 m$\mu$ wavelength ray is suitable to photoexcite $Ta_2O_5$ film.

Figure 8:
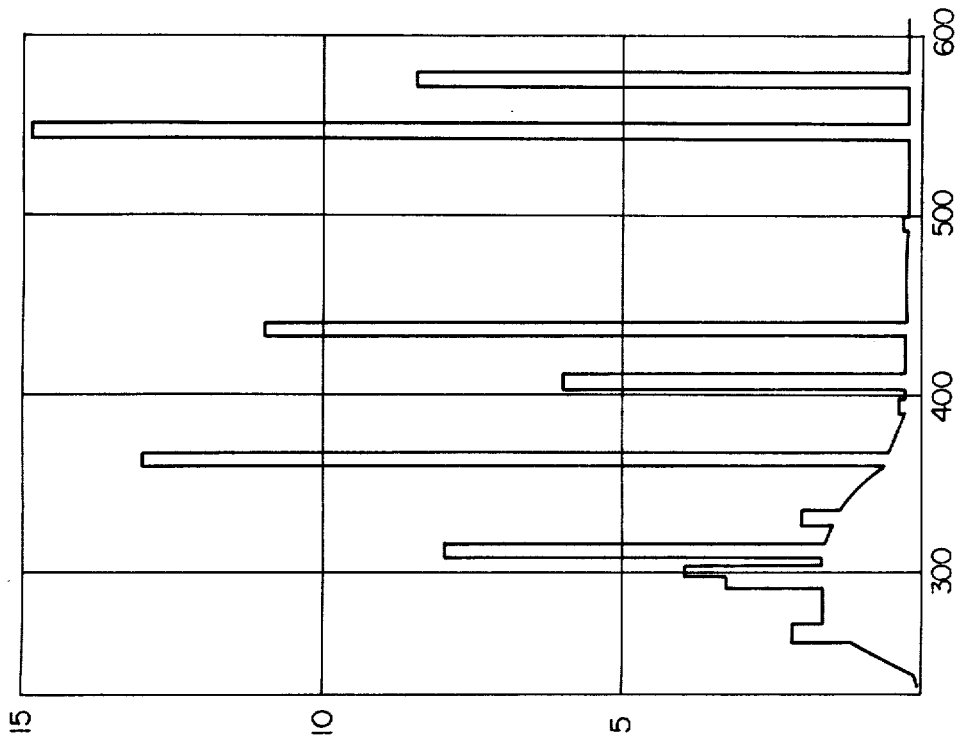
FIG. 8 is a graph showing the wavelength distribution of a high pressure mercury lamp used in an embodiment of this invention.

When $Ta_2O_5$ is irradiated by this wavelength (either monochromatic or panchromatic radiation is available), photocurrent is induced in the oxide film by the mechanism previously described. For this purpose, such radiation source as high pressure mercury lamp is available. FIG. 8 indicates wavelength distribution of this lamp. In other cases such as with TiO, NbO, $Al_2O_3$, YtO, the same kind of radiation source which emits rays having the same energy as the forbidden band gap of each metal oxide semiconductor, can be used to give the same effect.

Since with light irradiation, much higher deposition current can be imparted to the oxide film, the desired amount of $MnO_2$ can be obtained for much less time by electrolysis. In this invention 2 or 3 hours are sufficient for deposition, while in the case of the prior art, 6 to 7 hours are required.

Referring to the $MnO_2$ layer of thin film capacitor, the thinner the deposited $MnO_2$ layer, the lower the dissipation factor and the leakage current. This means that a short time for electrolysis is good for the electrolytic properties of the capacitors. On the other hand, extremely thin $MnO_2$ layer makes the breakdown voltage of the capacitor much lower although leakage current at the lower voltage is small. According to these two characteristic properties, electrolysis times for 15 - 30 min. in favorable to deposit the $MnO_2$ layer of the thin film electrolytic capacitors.

Figure 9:
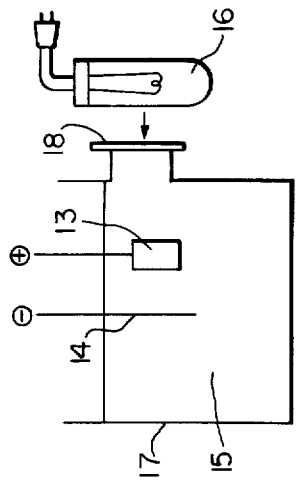
FIGS. 9, 10 and 11 are sectional views showing the methods of light irradiation employed in embodiments of this invention.
Figure 10:
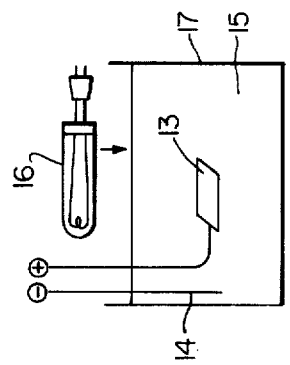
Figure 11:
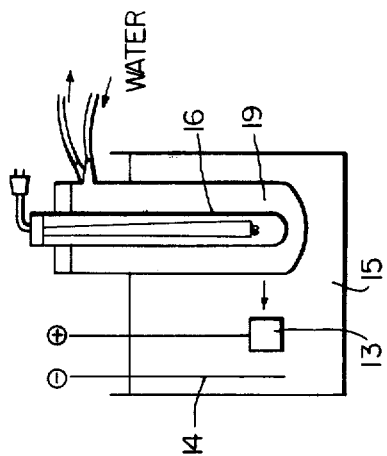

Examples of irradiation methods and apparatus according to this invention are shown in FIGS. 9 - 11. In these figures, numeral 13 represents anode element, 14 negative electrode, 15 electrolyte and 16 radiation source.

Referring to FIG. 9, vessel 17 has a quartz window 18 and irradiation by the radiation source 16 is made through the window 18. This method is most common in this invention.

Referring to FIG. 10, radiation source 16 is placed above the vessel 17 and irradiation is made directly through the electrolyte 15.

Referring to FIG. 11, numeral 19 represents water tank for cooling. The radiation source 16 is placed inside the water tank 19. The water tank 19 is immersed in the electrolyte 15, so that irradiation is made from the position adjacent to the anode element 13.

Application of this invention to various types of capacitor is as follows;

In the case of a plate type capacitor or thin film capacitor, the method of this invention can be readily applied to make them. The $MnO_2$ layer can be deposited onto the plane oxide film by electrolysis with the irradiation. This method is described in detail in Example 1. In the case of sintered body type, the sintered body has a dielectric oxide film both outside and inside the body. In this case, since irradiation light can not reach the oxide film inside, no photo-current is induced in the inner oxide film and the metal oxide is hardly deposited inside the sintered body by electrolysis. In this case, prior to the electrodeposition on the outer surface of the body, inner pores of the sintered body are filled with semiconductive oxide by pyrolyzing the metallic salts, for example manganese nitrate and nickel nitrate, manganese acetate, lead nitrate and nickel nitrate. After filling the pores with metal oxide by pyrolysis, the dielectric oxide on the outer surface of the sintered body which is still not covered with semiconductive oxide is polarized anodically under the light irradiation in manganese salt solution. Thereby the metal oxide layer is deposited on the outer surface of the sintered body electrolytically, and thus sintered body is uniformly covered with the metal oxide. In this case both pyrolysis and electrolysis with irradiation are employed to give solid electrolyte onto the sintered body capacitor. As for a tubular sintered body with diameter of 7.0 mm and length of 10.0 mm by the prior art method 3 to 4 repeats of pyrolysis have to be performed to fill the inside pores and 5 to 6 repeats of pyrolysis is necessary to cover the outer surface, so that total repeats of pyrolysis are 9 to 10.

By this invention, the latter 5 to 6 steps of pyrolysis to cover the outer surface are not necessary at all.

Figure 4:
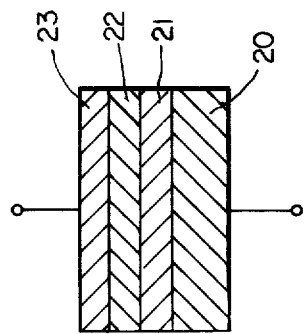
FIG. 4 is a sectional view showing a solid electrolytic capacitor obtained by the method of this invention.

A solid electrolytic capacitor according to this invention has such a structure such as shown in FIG. 4. Numeral 20 represents a base material of a valve action metal, 21 a dielectric film formed by oxidizing the surface of said base material, 22 an electrolyte layer of a semiconductive metal oxide deposited on said dielectric film 21, and 23 a cathode layer.

Examples embodying this invention are given in the following:

EXAMPLE 1

Electrolytic oxidation was caused to proceed in an 0.05 % citric acid solution at room temperature for 2 hours to form a 50 V dielectric film on a high purity tantalum plate. Thus-obtained plate was then subjected to the electrolytic oxidation with 250 to 300 m$\mu$ wavelength irradiation in an electrolyte of 1 M /1 $MnSO_4$ solution with an anodic current density of 500 $\mu$A /4 $cm^2$-plate at a temperature of 90° C for 3 hours. Thereafter, the thusanodized plate was subjected to heat treatment at a temperature of 200° C for 30 min. Finally, the capacitor was completed by adding a cathode layer such as colloidal carbon, silver paint and solder. Results of measurements made on the resultant samples are shown in the table 1, in which the results of the prior art method are also shown for comparison.

Table 1

| | Leakage current at 10 V ($\mu$A) | Capacitance ($\mu$F) | Dissipation (%) |
|---|---|---|---|
| Example 1 | 0.005 | 0.2 | 2.0 |
| Prior art (1) | 0.05 | 0.2 | 2.0 |
| Prior art (2) | 0.02 | 0.2 | 2.0 |

Prior art (1): Pyrolysis only
Prior art (2): Pyrolysis and following dark-electrolysis

EXAMPLE 2

Electrolytic oxidation was caused to proceed in a 0.05% citric acid solution at room temperature for 3 hours to form a 80 V dielectric film on a tubular tantalum sintered body of 3 gr weight, with diameter of 7 mm and length of 10 mm. Thus-obtained sample was then subjected 3 times to the conventional pyrolyte process using $Mn(NO_3)_2$ solution (s.p. 1.4). Then it was subjected to a photoelectrolytic oxidation process in 0.01 M/1 $MnOAc_2$ solution as the electrolyte with an anode current density of 2 mA/one-body, with respect to the area of the sample and at a temperature of 90° C for 2 hours. The radiation source was high pressure mercury vapor lamp (75 W). Thereafter the sample was subjected to heat treatment at a temperature of 200° C for 30 min. Finally capacitor was completed by adding cathode layer. Results of measurement made on the resultant samples are shown in the table 2, in which the results of the prior art are also shown.

Table 2

| | Leakage Current at 20 V ($\mu$A) | Capacitance ($\mu$F) | Dissipation (%) | Time of Pyrolysis |
|---|---|---|---|---|
| Example 2 | 0.02 | 180 | 2.0 | 3 |
| Prior art (3) | 0.5 | 180 | 2.0 | 12 |
| Prior art (4) | 0.1 | 180 | 2.0 | 6 |

Prior art (3): Pyrolysis only
Prior art (4): Pyrolysis and following dark-electrolysis

What is claimed is:

1. A method of manufacturing a solid electrolytic capacitor, which comprises the steps of:
   anodizing the surface of a base material of valve action metal to form a semiconductive dielectric film;
   electrodepositing a semiconductive metal oxide on said dielectric film by electrolytically oxidizing an electrolyte comprising a metallic salt solution at a temperature above 70° C, with said dielectric film being used as an anode and being irradiated with radiation, the energy of which is high enough to allow valence electrons of the dielectric film to enter the conduction band, subjecting said metal oxide film to heat treatment at above 110° C; and forming a cathode layer on said metal oxide film.

2. A metod of manufacturing a solid electrolytic capacitor as claimed in claim 1, wherein the temperature of said metallic salt solution during the anodic oxidation is between 70° C and 99° C.

3. A method of manufacturing a solid electrolytic capacitor as claimed in claim 1, wherein the pH of said metallic salt solution during the electrolysis is between 3 and 7.

4. A method of manufacturing a solid electrolytic capacitor as claimed in claim 1, wherein said valve action metal comprises tantalum, aluminum, titanium, zirconium, hafnium, alloys of these metals, silicon or germanium.

5. A method of manufacturing a solid electrolytic capacitor as claimed in claim 1, wherein said metallic salt solution comprises manganese nitrate, manganese acetate, lead nitrate or nickel nitrate.

6. A method of manufacturing a solid electrolytic capacitor as claimed in claim 1, wherein said anodizing step is performed by immersing said substrate in an aqueous solution of acetic acid, citric acid, succinic acid, phosphoric acid, or ammonium phosphate or a fused salt bath.

7. A method of manufacturing a solid electrolytic capacitor as claimed in claim 1, further comprising a step of pyrolytically depositing said metal oxide onto said dielectric film from metallic salt, prior to said electrodepositing step.

8. A method of manufacturing a solid electrolytic capacitor as claimed in claim 1, wherein said irradiation is performed with high pressure mercury vapor lamp.

9. A method of manufacturing a solid electrolytic capacitor as claimed in claim 1, wherein anode current density in said electrodepositing step is in the range of 200 $\mu A/cm^2$ to 2000 $\mu A/cm^2$.

* * * * *